US009373089B2

(12) United States Patent
Klinnert et al.

(10) Patent No.: US 9,373,089 B2
(45) Date of Patent: Jun. 21, 2016

(54) INTELLIGENT ELECTRONIC MONITORING SYSTEM

(71) Applicant: Robert Bosch GmbH, Stuttgart (DE)

(72) Inventors: Roland Klinnert, Korntal (DE); Naveen Ramakrishnan, Wexford, PA (US); Michael Dambier, Bretten (DE)

(73) Assignee: Robert Bosch GmbH, Stuttgart (DE)

( * ) Notice: Subject to any disclaimer, the term of this patent is extended or adjusted under 35 U.S.C. 154(b) by 242 days.

(21) Appl. No.: 14/133,732

(22) Filed: Dec. 19, 2013

(65) Prior Publication Data

US 2014/0172759 A1    Jun. 19, 2014

Related U.S. Application Data

(60) Provisional application No. 61/739,641, filed on Dec. 19, 2012.

(51) Int. Cl.
| | | |
|---|---|---|
| *G06F 15/18* | (2006.01) | |
| *G06N 99/00* | (2010.01) | |
| *G08B 21/02* | (2006.01) | |
| *G08B 21/04* | (2006.01) | |
| *G08B 21/22* | (2006.01) | |
| *G07C 9/00* | (2006.01) | |

(52) U.S. Cl.
CPC .......... *G06N 99/005* (2013.01); *G07C 9/00111* (2013.01); *G08B 21/0269* (2013.01); *G08B 21/0423* (2013.01); *G08B 21/22* (2013.01)

(58) Field of Classification Search
USPC .......................................................... 706/12
See application file for complete search history.

(56) References Cited

U.S. PATENT DOCUMENTS

| | | | | |
|---|---|---|---|---|
| 5,680,476 | A * | 10/1997 | Schmidt | G06K 9/66 382/159 |
| 6,054,928 | A | 4/2000 | Lemelson et al. | |
| 6,404,702 | B1 * | 6/2002 | Klinnert | G01S 7/285 342/145 |
| 6,614,388 | B2 * | 9/2003 | Klinnert | G01S 7/36 342/108 |
| 7,109,916 | B2 * | 9/2006 | Klinnert | G01S 13/003 342/134 |
| 7,123,545 | B2 * | 10/2006 | Klinnert | G01S 7/52004 367/99 |
| 8,390,440 | B2 * | 3/2013 | Krautter | B60K 35/00 340/435 |
| 8,647,287 | B2 * | 2/2014 | Greenberg | A61B 5/002 600/595 |
| 8,682,356 | B2 * | 3/2014 | Poe | H04W 24/00 455/456.1 |
| 2007/0063853 | A1 | 3/2007 | Derrick et al. | |

FOREIGN PATENT DOCUMENTS

WO      2006121930 A2    11/2006

OTHER PUBLICATIONS

Using phase-current sensing circuit as the position sensor for brushless DC motors without shaft position sensor Lin, R.-L.; Hu, M.-T.; Chen, S.-C.; Lee, C.-Y. Industrial Electronics Society, 1989. IECON '89., 15th Annual Conference of IEEE Year: 1989 pp. 215-218 vol. 1, DOI: 10.1109/IECON.1989.69637 IEEE Conference Publications.*
Analysis and Improvement on the Structure of Variable Reluctance Resolvers Lizhi Sun Magnetics, IEEE Transactions on Year: 2008, vol. 44, Issue: 8 pp. 2002-2008, DOI: 10.1109/TMAG.2008.923315 IEEE Journals & Magazines.*
Emulator for a DC-Machine, working as an actuator in a torque split unit of an all-wheel driven automobile Schuster, T.; Krischan, K.; Seebacher, R.R.; Dannerer, G. Power Electronics and Applications, 2007 European Conference on Year: 2007 pp. 1-10, DOI: 10.1109/EPE.2007.4417605 IEEE Conference Publications.*
International Search Report and Written Opinion corresponding to PCT Application No. PCT/US2013/076691, mailed Jun. 18, 2014 (9 pages).

* cited by examiner

*Primary Examiner* — Michael B Holmes
(74) *Attorney, Agent, or Firm* — Maginot Moore & Beck LLP

(57) ABSTRACT

A method of monitoring a position of a moveable entity includes equipping a moveable entity with a position sensor that outputs position signals indicating current geographical positions of the sensor, and using a machine learning system to process the position signals in accordance with a machine learning algorithm to identify reference positions indicated by the position signals corresponding to a first type of activity performed by the entity. Rules are defined based on the identified reference positions. The computer processor then monitors the position signals and apply the rules to the position signals to identify positions that violate the rules.

14 Claims, 2 Drawing Sheets

INTELLIGENT ELECTRONIC MONITORING SYSTEM

CROSS-REFERENCE TO RELATED APPLICATIONS

This application claims priority to U.S. Provisional Application Ser. No. 61/739,641 entitled "INTELLIGENT ELECTRONIC MONITORING SYSTEM" by Klinnert et al., filed Dec. 19, 2012, the disclosure of which is hereby incorporated herein by reference in its entirety.

TECHNICAL FIELD

The present disclosure relates generally to electronic monitoring systems, and in particular, to electronic monitoring systems for home detention.

BACKGROUND

Electronic monitoring systems are used to detect and monitor the location of individuals, such as home detainees. These systems typically comprise a portable tracking unit, such as an ankle monitor, that is worn by the individual that is monitored. The tracking unit transmits position data to a remote system for processing. Personnel at the monitoring facility monitor the position data to identify when the individual has violated position and/or time constraints of their detention. When a violation has been identified, the monitoring personnel can alert law enforcement so that appropriate action can be taken.

Previously known monitoring systems and home detention systems typically require nearly constant monitoring to ensure that any abnormal movements are detected so that law enforcement can be informed. In addition, these systems also require that position and time constraint parameters be identified beforehand so they can be applied during monitoring. These constraints can be different for each individual that is monitored. Consequently, previously known electronic monitoring systems require a significant amount of time and effort be expended in setting up and maintaining.

DRAWINGS

Figure 1:
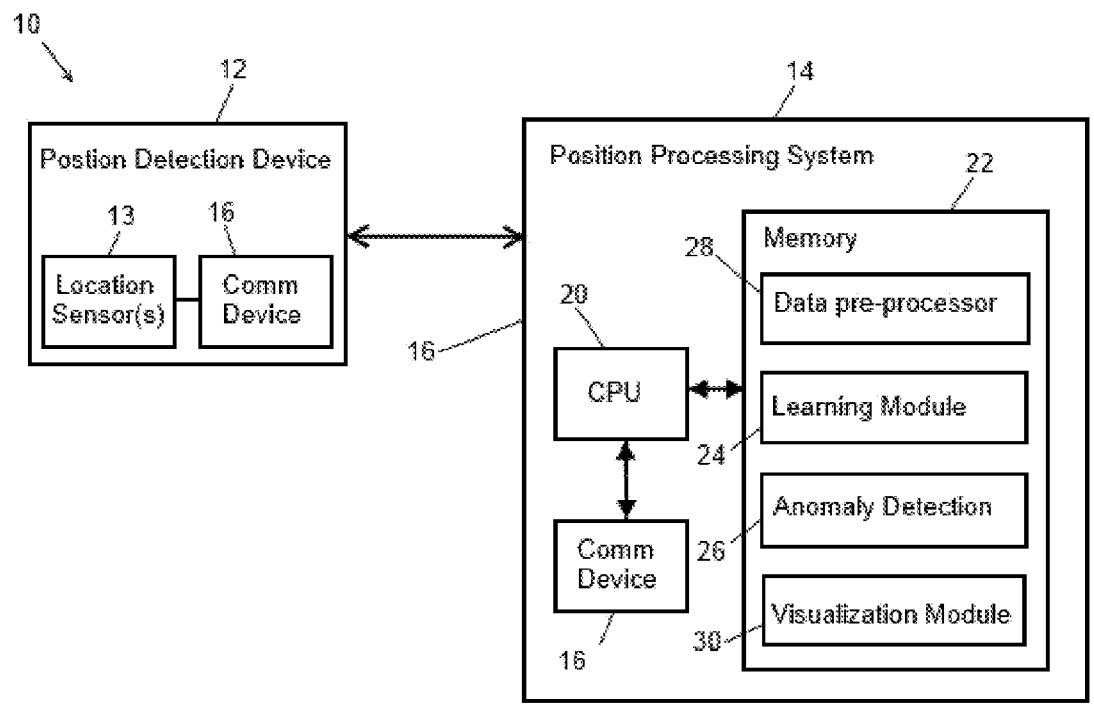

FIG. 1 schematically depicts an embodiment of an intelligent electronic monitoring system in accordance with the present disclosure.

Figure 2:
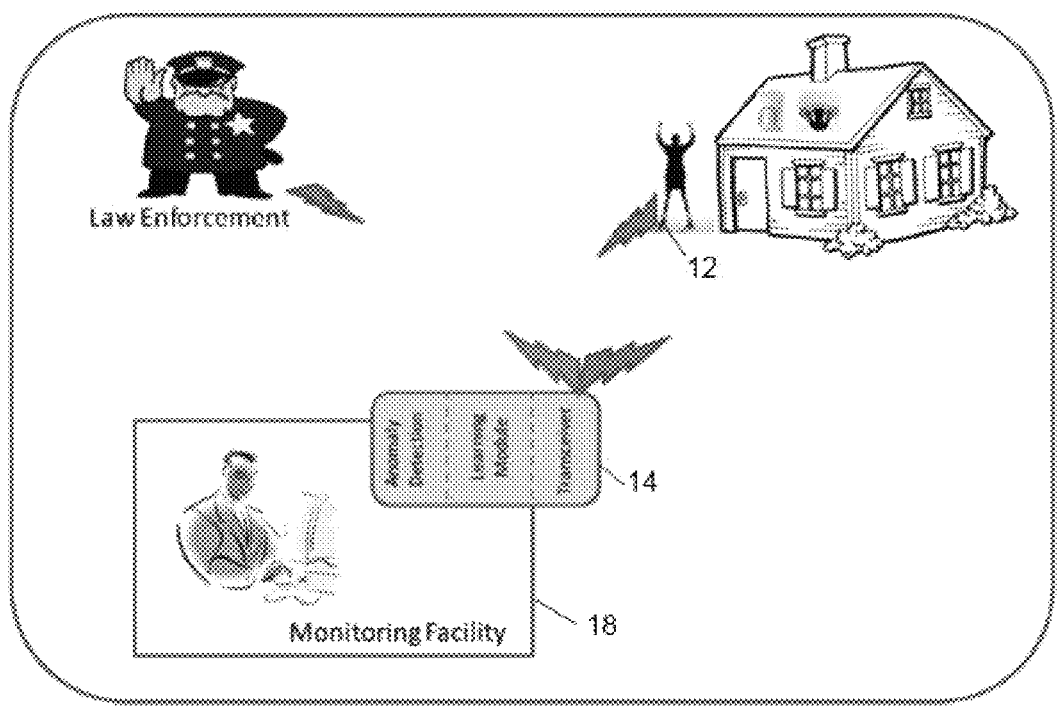

FIG. 2 schematically depicts an embodiment of the intelligent electronic monitoring system configured for use as a home detention system.

DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

The present disclosure is directed to an intelligent electronic monitoring system for monitoring and tracking positions and movement patterns of individuals. The intelligent electronic monitoring system includes a "learning" component which can process position data to learn typical movement patterns and times of a monitored individual and then detect abnormal movements automatically using the learned model so that monitoring personnel can be alerted. Such a system can reduce the amount of time and effort required of personnel in monitoring positions and movements of monitored individuals to detect abnormalities. Such a system can also simplify the setup and implementation of the monitoring system by reducing the amount of time required to define and setup the position limits and rules for the monitoring system.

FIG. 1 schematically depicts an embodiment of an intelligent electronic monitoring system in accordance with the present disclosure. As depicted in FIG. 1, the monitoring system includes a portable position detection device 12 and a position processing system 14. The portable position detecting device 12 is configured to be carried or transported in some manner by an moveably entity, such as an individual, an animal, a child, or robot, and includes one or more location sensing devices 13 that are configured to continuously or periodically output position signals indicating the current position of the device 12. The device 12 may include a wearable component, such as a bracelet, anklet, strap, necklace, or the like. Alternatively, the device 12 may be configured to be attached or implanted into the body of the moveable entity. The location sensor(s) 13 can be any type and/or combination of sensors and devices that are capable of detecting or outputting signals indicative of positions. In one embodiment, the location sensor(s) 13 comprise a Global Positioning System (GPS).

The position processing system 14 includes one or more processors 20, which may comprise a central processing unit (CPU), an application specific integrated circuit (ASIC), a field programmable gate array (FPGA) device, a micro-controller, or the like. The processor 20 is configured to execute programmed instructions that are stored in the memory 22. The memory 22 can be any suitable type of memory, including solid state memory, magnetic memory, or optical memory, just to name a few, and can be implemented in a single device or distributed across multiple devices. The position processing system 14 includes a variety of system modules that are stored as instructions in the memory 22 for execution by the processor (CPU) 20 in processing the position signals received from the device 12. These modules include at least a learning module 24 and an anomaly detection module 26.

During an initialization process, after the moveable entity has been equipped with the position detection device 12, position data from the sensor(s) 13 is monitored and processed by the learning module, i.e. the processor 20 executing programmed instructions, to discover structure in the data, such as frequently used positions and movement patterns, corresponding to the normal or typical activities performed by the moveable entity. The learning module may also be configured to utilize time data to further classify and differentiate positions and movement patterns. Time data can be used to differentiate weekend positions and movement behavior from weekday positions and movement behavior and/or to differentiate positions and movements at different times of day.

In one embodiment, the learning module 24 implements a machine learning algorithm to process the position data received from the sensor(s) 13. Examples of algorithms that may be implemented in the learning module 24 include Cluster Analysis, Artificial Neural Networks, Support Vector Machines, k-Nearest Neighbors, Gaussian Mixture Models, Naive Bayes, Decision Tree, RBF classifiers and the like. A data pre-processor 28 may be implemented in the processing system 14 for preparing and filtering the position data for the learning module to eliminate data that could produce misleading results. For example, the data pre-processor 28 can be used to omit or limit position data that is outside of a physically possible range for the positions data.

The learning module 24 processes the position data to identify reference positions, movement patterns and times that correspond to the normal activities or behaviors of the entity being monitored. These learned reference positions and movement patterns can then be used as the basis for detecting abnormal locations and movement patterns of the entity so that remedial action can be taken. For example, the learning module 24, or another component of the system, may include instructions for defining rules or parameters (e.g., learned rules) based on the learned reference positions and movement patterns. The rules may then be stored in memory 22 for access by the processor. The learned reference positions and rules can be determined and set during a predefined initialization period. Once set, the reference positions and rules may be remain unchanged until a re-initialization process is performed. Alternatively, the learning module may be used to continuously or periodically updated the reference positions and rules information during use of the system.

The rules may define acceptable positions in relation to the reference positions which are deemed to not be in violation of the rules and/or that define unacceptable positions in relation to the reference positions that are deemed to be in violation of the rules. The rules may also define times of day for one or more positions during which the positions will be deemed to be in violation or not in violation of the rules. In addition to learned rules, static rules may be defined that identify positions, movement patterns, and/or times of day that are to be considered acceptable and/or in violation of the rules.

The anomaly detection module 26 includes instructions for how the rules are to be applied to the position data and the action to be taken when rule conditions are met or violated, such as generating an alert, activating an alarm, etc. The type of alert or alarm generated depends on the exact configuration of the system.

In one embodiment, the position processing system 14 is located at a monitoring facility remote from the position detection devices 12. A communication system 16 is used to transmit position data from the position detection devices 12 to the position processing system 14 at the monitoring facility. For example, in one embodiment, the portable position detecting device 12 and the processing system 14 may each be coupled to a communication device 16, such as transceiver, for transmitting and receiving position data. The communication system 16 may make use of any suitable type of communication, including wireless and wired communications, radio communications, standard cellular telephone technology, or other two-way communication methods, to enable data communications to the monitoring facility.

FIG. 2 depicts a schematic view of the intelligent electronic monitoring system that comprises a virtual custody system for use in home detention programs implemented by law enforcement agencies. In this embodiment, the virtual custody system includes a position detection device 12 provided in the detainee's monitoring device (e.g., ankle bracelet). The position data is transmitted to the position processing system 14 located at a monitoring facility. When an abnormal movement is detected, the position processing system 14 transmits an alert to the monitoring personnel. The monitoring personnel can alert law enforcement when appropriate. Alternatively, of course, the position processing system 14 can alert law enforcement directly.

Referring to FIG. 1, the processing system 14 may include a visualization module 30 that includes instructions that enable the position data from the device 12 to be presented on a visual display device, such as a monitor or view screen, in a format that can be more easily understood and is more intuitive for monitoring personnel. The monitoring personnel can then initiate the appropriate action.

As an alternative to processing the position data at a remote facility, the position processing system 14 may be incorporated into the position detection device 12 so that the position detecting, learning, and anomaly detection are all implemented locally with the portable device. In this embodiment, the device may be configured to transmit alerts via the communication system 16 when abnormal movements are detected. Alerts can be transmitted to the monitoring facility to other facilities or agencies, such as law enforcement agencies, for processing.

The intelligent electronic monitoring system can be utilized to monitor positions and detect abnormal movements for other purposes and in other situations other than home detention. For example, such system can be adapted to monitor children, animals, and vehicles that have a typical or predictable movement pattern.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of monitoring a position of a moveable entity, the method comprising:
   equipping a moveable entity with a position sensor that outputs position signals indicating current geographical positions of the position sensor;
   using a computer processor to process the position signals in accordance with a machine learning algorithm to identify reference positions indicated by the position signals corresponding to a first type of activity performed by the entity;
   defining rules based on the identified reference positions; and
   after the reference positions have been identified and the rules have been defined, using the computer processor to monitor the position signals and apply the rules to the position signals from the position sensor to identify when the current geographical position indicated by the position signals violates the rules.

2. The method of claim 1, further comprising:
   automatically activating an alert system when the position indicated by the position signals violates the rules.

3. The method of claim 2, wherein the rules include position constraints that define acceptable positions in relation to the reference positions which are deemed to not be in violation of the rules and/or that define unacceptable positions in relation to the reference positions that are deemed to be in violation of the rules.

4. The method of claim 3, wherein the rules include time constraints that define times of day for one or more positions during which the positions will be deemed to be in violation or not in violation of the rules.

5. The method of claim 2, wherein activating the alert system includes transmitting an alert signal to a monitoring system.

6. The method of claim 1, further comprising:
using a pre-processor to process the position signals to filter out misleading position data.

7. The method of claim 2, wherein the position sensor and the computer processor are configured as a unitary portable device that is provided in a portable housing configured to be worn on a body of the person.

8. The method of claim 7, wherein the identification of the reference positions, the definition of the rules, the monitoring of the rules to identify position violations, and the activation of the alert system are all performed by the portable device.

9. The method of claim 8, wherein the portable device includes a wireless communication system, and
wherein the computer processor is configured to transmit an alert signal via the wireless communication system in response to identifying a position violation.

10. The method of claim 2, further comprising:
transmitting the position signals wirelessly via a wireless communication system to a remote monitoring system;
using a computer processor at the remote monitoring system to to process the position signals to identify the reference positions and to apply the rules to the position signals to identify positions that violate the rules.

11. A position monitoring system comprising:
a position sensor configured to be carried by a moveable entity and that outputs position signals indicating current geographical positions of the sensor;
a machine learning system that receives the position signals and is configured to process the position signals in accordance with a machine learning algorithm to identify reference positions indicated by the position signals corresponding to a first type of activity performed by the entity;
a monitoring system that is configured to monitor the position signals and to apply rules to the position signals to generate an alert signal in response to receiving a position signal from the position sensor indicating a current geographical position that violates the rules; and
a wireless communication system configured to wirelessly transmit at least one of the position signals and the alert signal.

12. The system of claim 11, wherein the machine learning system and the monitoring system are implemented by a computer processor executing programmed instructions stored in a memory.

13. The system of claim 12, wherein the position sensor, the computer processor, the memory, and the communication system are provided in a portable housing configured to be transported by the movable entity, and
wherein the communication system is configured to transmit the alert signal to a predetermined destination automatically.

14. The system of claim 11, wherein the position sensor and the communication system are provided in a portable housing configured to be transported by the movable entity,
wherein the machine learning system and the monitoring system are located at a remote monitoring facility, and
wherein the communication system is configured to transmit the position signals automatically to the remote monitoring facility.

\* \* \* \* \*